United States Patent
Li et al.

(10) Patent No.: US 10,451,710 B1
(45) Date of Patent: Oct. 22, 2019

(54) USER IDENTIFICATION METHOD AND USER IDENTIFICATION APPARATUS

(71) Applicant: BOE Technology Group Co., Ltd., Beijing (CN)

(72) Inventors: Hongyang Li, Beijing (CN); Xin Li, Beijing (CN); Xiangdong Yang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/172,102

(22) Filed: Oct. 26, 2018

(30) Foreign Application Priority Data

Mar. 28, 2018 (CN) .......................... 2018 1 0265531

(51) Int. Cl.
*H04R 3/00* (2006.01)
*G01S 5/20* (2006.01)
*G10L 17/00* (2013.01)
*H04R 1/40* (2006.01)

(52) U.S. Cl.
CPC .............. *G01S 5/20* (2013.01); *G10L 17/005* (2013.01); *H04R 1/406* (2013.01)

(58) Field of Classification Search
CPC ....................................................... H04R 3/00
See application file for complete search history.

(56) References Cited

U.S. PATENT DOCUMENTS

| | | | |
|---|---|---|---|
| 2007/0203699 A1* | 8/2007 | Nagashima | G10L 15/22 704/241 |
| 2008/0071547 A1* | 3/2008 | Prieto | B60N 2/002 704/275 |
| 2008/0140400 A1* | 6/2008 | Blass | G10L 15/22 704/246 |
| 2015/0127338 A1* | 5/2015 | Reuter | G10L 15/20 704/233 |
| 2016/0173676 A1* | 6/2016 | Heo | H04M 1/6091 455/569.1 |
| 2017/0150255 A1* | 5/2017 | Wang | G04G 21/06 |
| 2017/0352349 A1* | 12/2017 | Vrazic | G10L 15/20 |
| 2018/0249267 A1* | 8/2018 | Klingler | H04R 1/406 |
| 2019/0037363 A1* | 1/2019 | Tzirkel-Hancock | H04W 4/046 |

* cited by examiner

*Primary Examiner* — Olisa Anwah
(74) *Attorney, Agent, or Firm* — Kinney & Lange, P.A.

(57) ABSTRACT

The present disclosure relates to a user identification method applicable to a vehicle, the vehicle including at least two microphone arrays, the respective microphone arrays being disposed at different positions of the vehicle, respectively. The user identification method includes: receiving a voice of a user within the vehicle through the at least two microphone arrays; determining directions from the user to the microphone arrays, respectively, according to the voice; calculating an angle between any two of the directions; and identifying a type of the user based at least on the angle.

15 Claims, 9 Drawing Sheets

USER IDENTIFICATION METHOD AND USER IDENTIFICATION APPARATUS

CROSS-REFERENCE TO RELATED APPLICATION(S)

This application claims priority to Chinese Application No. 201810265531.1, entitled "USER IDENTIFICATION METHOD, USER IDENTIFICATION APPARATUS, AND ELECTRONIC DEVICE" and filed on Mar. 28, 2018, which is incorporated herein by reference in its entirety.

TECHNICAL FIELD

The present disclosure relates to the field of identification technology, and in particular to a user identification method and a user identification apparatus.

BACKGROUND

As the degree of intelligence of an automobile increases, the current automobile may already receive and identify the voice of a user inside the automobile to perform a corresponding action.

However, the current automobile can only identify the user's voice, but cannot identify the type of the user who produces the voice, such as a driver or a passenger.

SUMMARY

The present disclosure provides a user identification method and a user identification apparatus.

According to a first aspect of the embodiments of the present disclosure, a user identification method is provided. The user identification method is applicable to a vehicle including at least two microphone arrays, the respective microphone arrays being disposed at different positions of the vehicle, respectively. The user identification method includes:

receiving a voice of a user within the vehicle through the at least two microphone arrays;

determining directions from the user to the microphone arrays, respectively, according to the voice;

calculating an angle between any two of the directions; and identifying the type of the user based at least on the angle.

Optionally, the at least two microphone arrays consist of two microphone arrays.

Optionally, a first one of the two microphone arrays is disposed on a side of a driver seat of the vehicle that is away from a copilot seat, and is in line with the driver seat and the copilot seat; and a second one of the two microphone arrays is disposed straight ahead of the copilot seat of the vehicle.

Optionally, the type comprises "driver" and "passenger", wherein the identifying the type of the user based at least on the angle includes:

determining that the type is "driver" if the angle is greater than 90 degrees; and determining that the type is "passenger" if the angle is less than or equal to 90 degrees.

Optionally, a first one of the two microphone arrays is disposed on a side of a driver seat of the vehicle that is away from a copilot seat, and a second one of the two microphone arrays is disposed ahead of the copilot seat of the vehicle.

Optionally, the type comprises "driver" and "passenger", wherein the identifying the type of the user based at least on the angle includes:

determining that the type is "driver" if the angle is greater than a threshold angle; and determining that the type is "passenger" if the angle is less than the threshold angle.

Optionally, the user identification method includes:

generating a control instruction according to the voice;

determining whether the user of the type has a privilege to execute the control instruction according to a correspondence between types and control instructions stored in advance; and executing the control instruction If the user of the type has the privilege.

Optionally, the user identification method further includes:

determining an intensity of the voice before identifying the type of the user based on at least the angle; and the identifying the type of the user based on at least the angle includes:

identifying the type of the user based on the angle and the intensity.

According to a second aspect of the embodiments of the present disclosure, a user identification apparatus applicable to a vehicle is provided. The user identification apparatus includes:

a processor;

a memory storing instructions that, when executed by the processor, cause the processor to:

receive, from at least two microphone arrays included in the vehicle and disposed at different positions of the vehicle, respectively, a voice of a user within the vehicle detected by the at least two microphone arrays;

determine directions from the user to the microphone arrays, respectively, according to the voice;

calculate an angle between any two of the directions; and identify a type of the user based at least on the angle.

Optionally, the at least two microphone arrays consist of two microphone arrays.

Optionally, a first one of the two microphone arrays is disposed on a side of a driver seat of the vehicle that is away from a copilot seat, and is in line with the driver seat and the copilot seat; and a second one of the two microphone arrays is disposed straight ahead of the copilot seat of the vehicle.

Optionally, the type includes "driver" and "passenger", and the instructions, when executed by the processor, further cause the processor to:

determine that the type is "driver" if the angle is greater than 90 degrees; and determine that the type is "passenger" if the angle is less than or equal to 90 degrees.

Optionally, a first one of the two microphone arrays is disposed on a side of a driver seat of the vehicle that is away from a copilot seat, and a second one of the two microphone arrays is disposed ahead of the copilot seat of the vehicle.

Optionally, the type includes "driver" and "passenger", and the instructions, when executed by the processor, further cause the processor to:

determine that the type is "driver" if the angle is greater than a threshold angle; and determine that the type is "passenger" if the angle is less than the threshold angle.

Optionally, the instructions, when executed by the processor, further cause the processor to:

generate a control instruction according to the voice;

determine whether the user of the type has a privilege to execute the control instruction according to a correspondence between types and control instructions stored in advance; and execute the control instruction If the user of the type has the privilege.

Optionally, the instructions, when executed by the processor, further cause the processor to:

determine an intensity of the voice; and identify the type of the user based on the angle and the intensity.

Optionally, the at least two microphone arrays are a part of the user identification apparatus.

It should be appreciated that the above general description and the following detailed description are intended to be exemplary and illustrative but not restrictive.

BRIEF DESCRIPTION OF THE DRAWINGS

The accompanying drawings are incorporated in the specification and consist of a part of the specification, showing the embodiments in accordance with the present disclosure and used for explaining the principles of the present disclosure in conjunction with the specification.

DETAILED DESCRIPTION

A part of exemplary embodiments of the present disclosure will be described in detail herein, examples of which are illustrated in the accompanying drawings. The following description refers to the same or similar elements in the different drawings, unless otherwise indicated. Implementations described in the following exemplary embodiments do not represent all implementations consistent with the present disclosure. Instead, they are merely examples of apparatuses and methods consistent with some aspects of the present disclosure as detailed in the appended claims.

Figure 1:
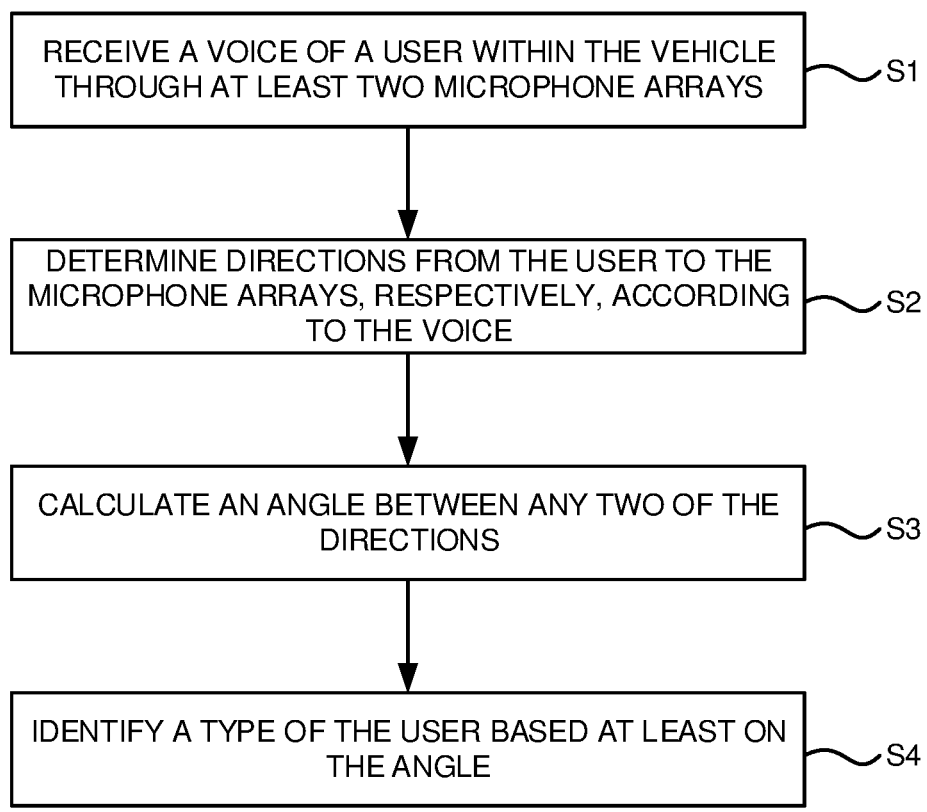
FIG. 1 is a schematic flow chart of a user identification method according to an embodiment of the present disclosure.

FIG. 1 is a schematic flow chart of a user identification method according to an embodiment of the present disclosure. The user identification method in the present embodiment may be applied to a vehicle, such as an automobile, an airplane, a ship, etc. The following embodiments are mainly exemplarily described by taking the automobile as an example of the vehicle. The vehicle includes at least two microphone arrays, the respective microphone arrays being disposed at different positions of the vehicle, respectively.

As shown in FIG. 1, the user identification method includes steps S1 to S4.

In step S1, a voice of a user within the vehicle is received through the at least two microphone arrays.

In an embodiment, the number of the microphone arrays may be set as required, for example, may be set to two or three, or even more. The following embodiments are mainly exemplarily illustrated in a case where two microphone arrays are provided.

In step S2, directions from the user to the microphone arrays are determined, respectively, according to the voice.

In an embodiment, the microphone array may consist of a plurality of microphones. After receiving a sound, the microphone array may determine directions from a sound source to the microphone arrays, respectively, wherein the process of determining the directions from the sound source to the microphone arrays by the microphone array may be implemented by approaches in related technology, and will not be repeatedly described here.

In step S3, an angle between any two of the directions is calculated.

In an embodiment, the microphone array may transmit the determined direction to a processor connected to each of the microphone arrays. Since the directions from the user to the microphone arrays are vectors, the processor may calculate, according to any two of the directions, the angle between the two directions.

In step S4, a type of the user is identified based at least on the angle.

In an embodiment, since different types of users within the vehicle are typically located at different positions, for example, a driver is typically located on a seat at a front row corresponding to a steering wheel, and a passenger is located on a copilot seat and seats at a rear row. The angles between the directions from the users at different positions to the two microphone arrays are different.

FIGS. 2A to 2E are schematic diagrams of application scenarios of a user identification method according to an embodiment of the present disclosure. As shown in FIG. 2A to FIG. 2E, by taking a small-size automobile in which a driver seat is located at the left side of the automobile as an example, the automobile may be provided with two microphone arrays. For example, a first microphone array M1 is disposed at the left side of the driver seat, and is in line with the driver seat and a copilot seat, a second microphone array M2 is disposed straight ahead of the copilot seat, the driver D is located on the driver seat, and passengers P1, P2, P3, and P4 are located on the copilot seat and the rear row, respectively.

Figure 2A:
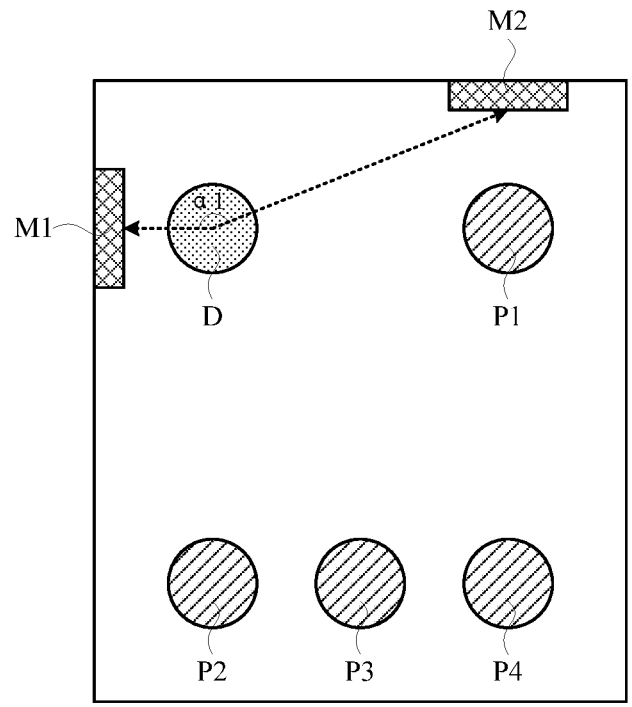
FIGS. 2A to 2E are schematic diagrams of application scenarios of a user identification method according to an embodiment of the present disclosure.

As shown in FIG. 2A, an angle α1 between directions from the driver D on the driver seat to the first microphone array M1 and to the second microphone array M2 is greater than 90 degrees.

Figure 2B:
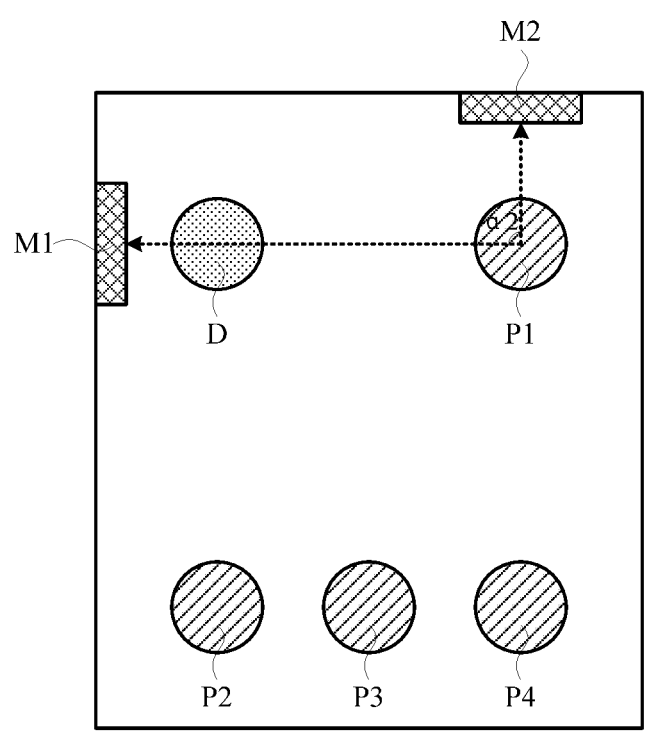

As shown in FIG. 2B, an angle α2 between directions from the passenger P1 on the copilot seat to the first microphone array M1 and to the second microphone array M2 is equal to 90 degrees.

Figure 2C:
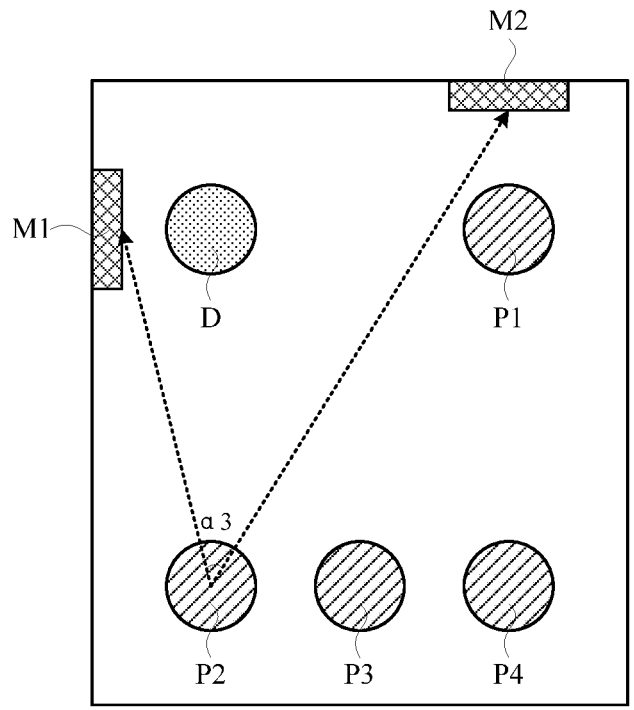

As shown in FIG. 2C, an angle α3 between directions from the passenger P2 on the left of the rear row to the first microphone array M1 and to the second microphone array M2 is less than 90 degrees.

Figure 2D:
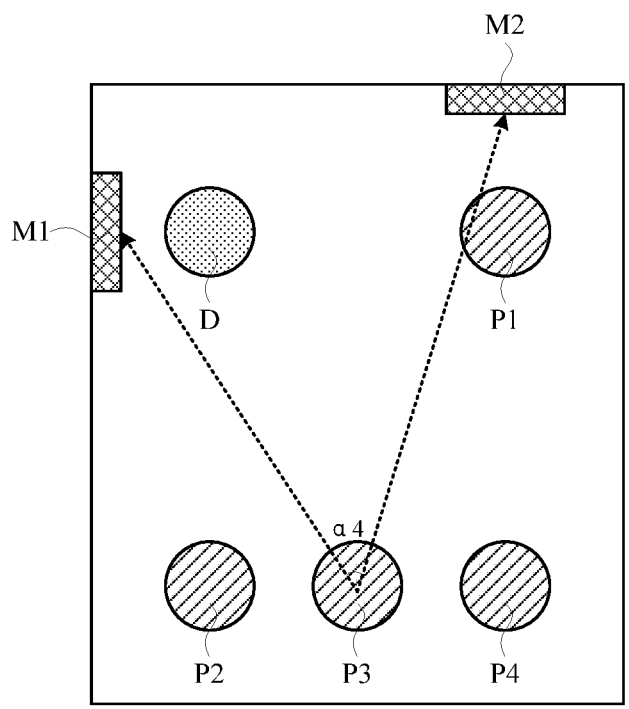

As shown in FIG. 2D, an angle α4 between directions from the passenger P3 on the middle of the rear row to the first microphone array M1 and to the second microphone array M2 is less than 90 degrees.

Figure 2E:
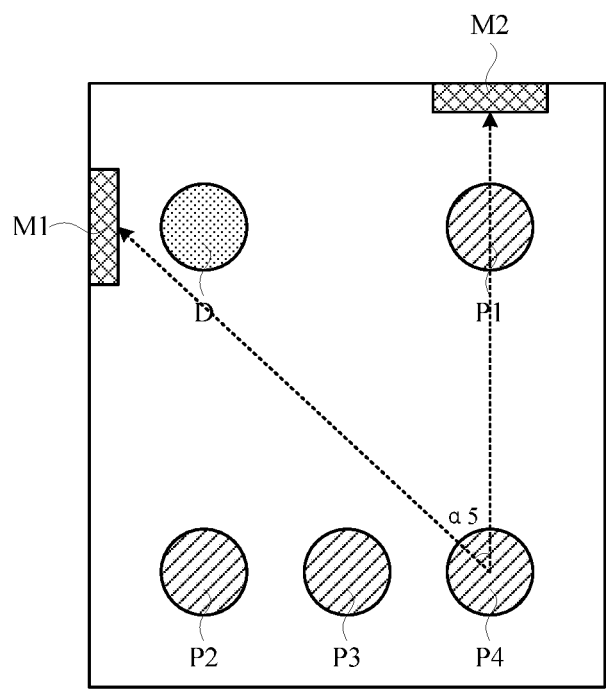

As shown in FIG. 2E, an angle α5 between directions from the passenger P4 on the right of the rear row to the first microphone array M1 and to the second microphone array M2 is less than 90 degrees.

As seen from FIGS. 2A to 2E, the angles formed between the directions from the users located at different positions in the vehicle to the two microphone arrays are different, wherein the angle formed between the directions from the user located at the position of the driver to the respective two microphone arrays (e.g., greater than 90 degrees) is significantly distinguished from the angles formed between the directions from the users located at other positions to the two respective microphone arrays (e.g., less than or equal to 90 degrees). Thus, the type of the user may be determined according to the angle between the directions from the user to the respective two microphone arrays.

By determining the type of the user, it may in turn be determined according to the determined type whether the user who issued the control instruction has a privilege to execute the control instruction, after the voice of the user is received and a control instruction is generated; and the control instruction is executed only when the user has the privilege, so as to ensure security of executing the action.

It should be noted that the embodiments of the present disclosure are not limited to identifying these two user types, i.e., "driver" and "passenger", in the case where other types of users are included in the vehicle, such as a ticket seller other than the driver and the passengers, or a coach other than the driver and the passengers, it may also be identified by the embodiments of the present disclosure.

Optionally, the at least two microphone arrays consist of two microphone arrays.

In an embodiment, the above directions may be calculated by two microphone arrays, so that only two microphone arrays are provided, which helps to reduce an overall hardware cost.

It should be noted that the number of the microphone arrays may be adjusted as needed.

Optionally, a first one of the two microphone arrays is disposed on a side of the driver seat of the vehicle that is away from the copilot seat, and is in line with the driver seat and the copilot seat; and a second one of the two microphone arrays is disposed straight ahead of the copilot seat of the vehicle.

The type includes "driver" and "passenger", and wherein the identifying the type of the user based at least on the angle includes:

determining that the type is "driver" if the angle is greater than 90 degrees; and determining that the type is "passenger" if the angle is less than or equal to 90 degrees.

It should be noted that the position of the microphone array may be adjusted as needed, and the types of the user are not limited to the above-mentioned "driver" and "passenger", and may be determined according to specific circumstances.

Optionally, the first one of the two microphone arrays is disposed on a side of the driver seat of the vehicle that is away from the copilot seat, and the second one of the two microphone arrays is disposed ahead of the copilot seat of the vehicle.

The type includes "driver" and "passenger", and wherein the identifying the type of the user based at least on the angle includes:

determining that the type is "driver" if the angle is greater than a threshold angle; and determining that the type is "passenger" if the angle is less than the threshold angle.

In an embodiment, when the first microphone array and the second microphone array are disposed, a threshold angle may be determined. For example, a midpoint of a line between a central position of the driver seat and a central position of the copilot seat may be firstly determined. a point, then an angle formed between directions from the midpoint to the first microphone array and the second microphone array is calculated as a threshold angle, the threshold angle being less than an angle formed between directions from the driver seat to the first microphone array and the second microphone array, and being greater than an angle formed between directions from the copilot seat to the first microphone array and the second microphone array.

The type is determined to be "driver" or "passenger" based on the angle between the two directions being greater than 90 degrees, or less than 90 degrees, or equal to 90 degrees. Since the user may not be at the central position of his corresponding seat when he utters the voice, for example, the head of the passenger on the copilot seat is deviated from the central position of the copilot seat, e.g., the head is deviated to the driver seat when he utters the voice, then the calculated angle between the two directions is also an obtuse angle, which thus may misidentify the passenger sitting on the copilot seat as the driver.

According to the present embodiment, the type of the user is determined by comparing a relationship between the angle between the two directions and the threshold angle, that is, if the angle is greater than the threshold angle, the type of the user is determined to be "driver"; and if the angle is less than the threshold angle, the type of the user is determined to be "passenger". Even if the head of the user is slightly deviated from the central position of the corresponding seat when the user utters the voice, the type of the user may still be determined accurately. For example, the head of the passenger on the copilot seat is slightly deviated to the driver seat when he utters the voice, then the angle between the two directions from the passenger to the first microphone array and the second microphone array is still calculated to be less than the threshold angle, as long as he does not deviate to the area between the midpoint as described above and the driver seat. Thus, according to the present embodiment, it may be determined that the type of the user is "passenger", thereby the type of the user may be determined accurately.

Also, according to the present embodiment, the requirements for disposing the positions of the first microphone array and the second microphone array may be reduced appropriately, that is, it is not necessary to ensure that the first microphone array is in line with the driver seat and the copilot seat and the second microphone array is disposed straight ahead of the copilot seat. Instead, it can be ensured that the type of the user is determined accurately, as long as the first microphone array is disposed on the side of the driver seat that is away from the copilot seat (e.g., may be deviated forward or backward) and the second microphone array is disposed ahead of the copilot seat (e.g., may be deviated to the left and the right). Thus, the arrangement of the first microphone array and the second microphone array may be simplified.

Figure 3:
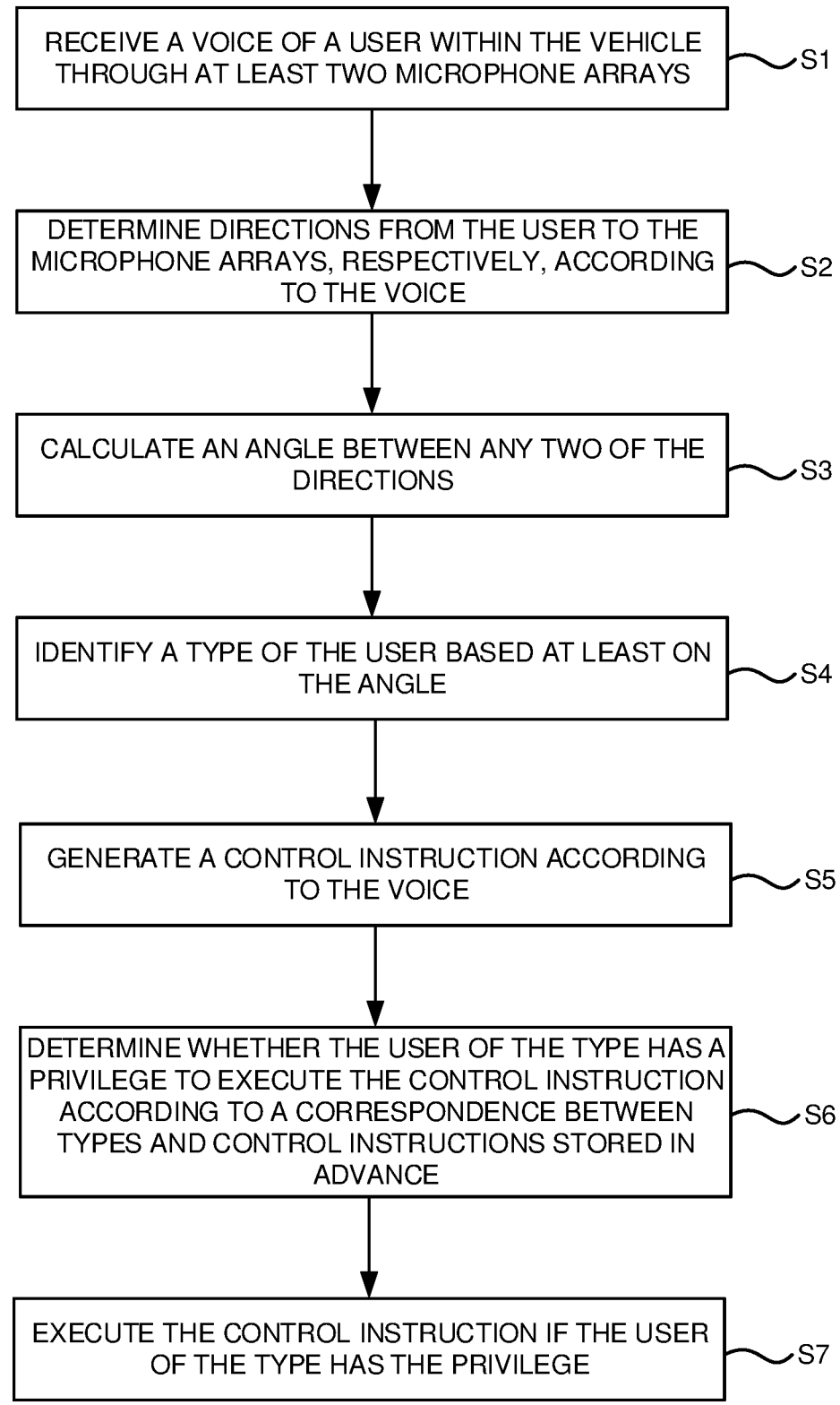
FIG. 3 is a schematic flow chart of another user identification method according to an embodiment of the present disclosure.

FIG. 3 is a schematic flow chart of another user identification method according to an embodiment of the present disclosure. As shown in FIG. 3, on a basis of the embodiment as shown in FIG. 1, the user identification method further includes:

step S5 of generating a control instruction according to the voice;

step S6 of determining whether the user of the type has a privilege to execute the control instruction according to a correspondence between types and control instructions stored in advance;

step S7 of executing the control instruction If the user of the type has the privilege.

In an embodiment, the control instruction may include a control instruction for controlling the vehicle, such as controlling steering of the vehicle, gear switching, cruise control, navigation, driving recorder shooting, lights on/off, switching of a rear view camera, and the like; and may also include a control instruction for controlling auxiliary functions of the vehicle, such as adjusting a temperature of an air conditioner, song switching, seat angle adjustment, window adjustment, radio volume adjustment, etc.

In general, only the driver has the privilege to execute the control instruction for controlling the vehicle, while the passenger may only execute the control instruction for controlling the auxiliary functions of the vehicle. Therefore, a correspondence between the type "passenger" and the control instructions for controlling the auxiliary functions of the vehicle and a correspondence between the type "driver" and all of the control instructions may be stored in advance. Based on this, when it is determined that the user is a driver, it is determined that the user has the privilege to execute any of the control instructions; and when it is determined that the user is a passenger, it is then determined whether the control instruction is a control instruction for controlling the auxiliary function of the automobile; if not, it is determined that the user has no privilege to execute the control instruction, thereby preventing the passenger from controlling the vehicle and causing interference to the driver, and ensuring the safety of the driver driving the vehicle.

Figure 4:
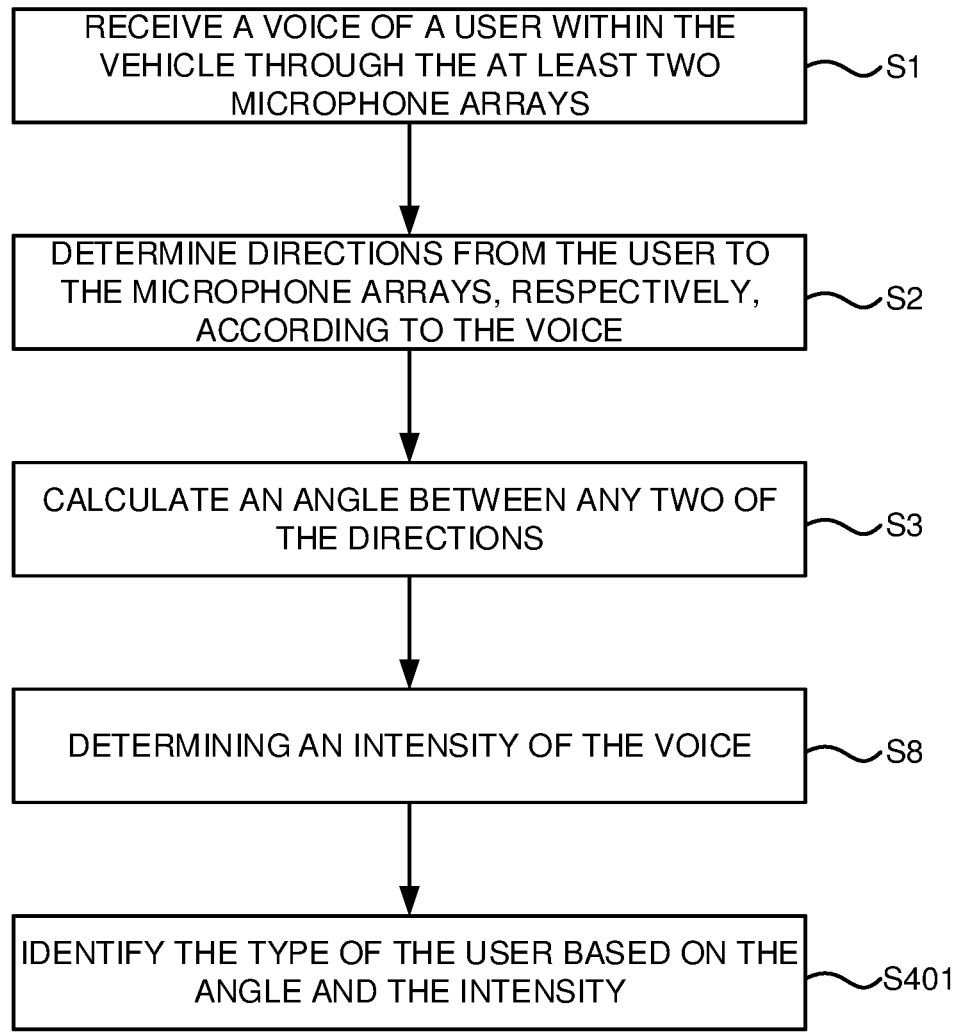
FIG. 4 is a schematic flow chart of another user identification method according to an embodiment of the present disclosure.

FIG. 4 is a schematic flow chart of another user identification method according to an embodiment of the present disclosure. As shown in FIG. 4, on a basis of the embodiment as shown in FIG. 1, the user identification method further includes:

step S8 of determining an intensity of the voice before the type of the user is identified according to the angle; the step S8 may be performed after step S3 as shown in FIG. 4; or the execution order may be adjusted as needed, as long as step S8 is ensured to be executed between steps S1 and S401.

The identifying the type of the user based on at least the angle includes:

step S401 of identifying the type of the user according to the angle and the intensity.

Figure 5:
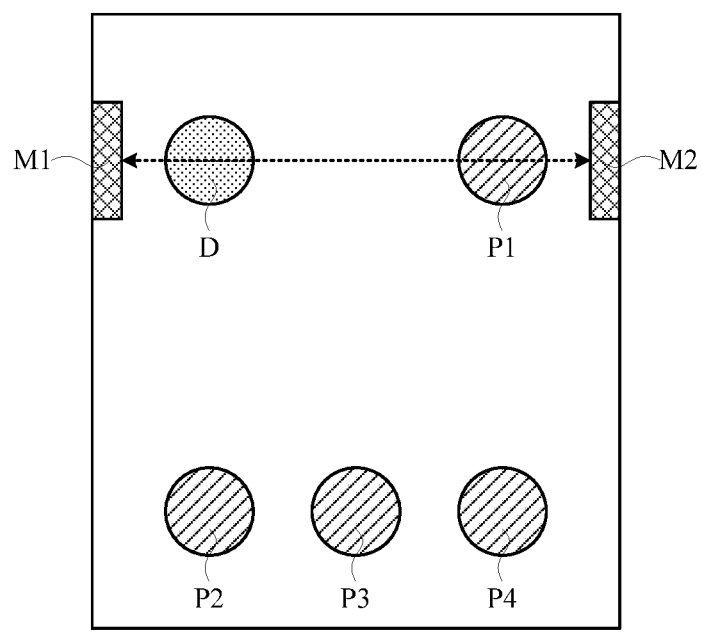
FIG. 5 is a schematic diagram of an application scenario of another user identification method according to an embodiment of the present disclosure.

In an embodiment, the positions of the microphone arrays for receiving the voice of the user may be different from those in the embodiments as shown in FIGS. 2A-2E. FIG. 5 is a schematic diagram of an application scenario of another user identification method according to an embodiment of the present disclosure.

As shown in FIG. 5, the first microphone array M1 is disposed on the left side of the driver position, and the second microphone array M2 is disposed on the right side of the copilot position, whereby the angle between the directions from the driver at the driver position to the respective two microphone arrays is a flat angle, that is, 180°, but the angle between the directions from the passenger at the copilot position to the respective two microphone arrays is also a flat angle. The driver at the driver position and the passenger at the copilot position cannot be distinguished based on the angles only.

However, the driver at the driver position is closer to the first microphone array and is farther from the second microphone array, while the passenger at the copilot position is closer to the second microphone array and is farther from the first microphone array. Farther. The intensity of the voice received by the microphone array is inversely proportional to the distance from the voice source to the microphone array. Therefore, when the angle is determined to be 180°, it may be further determined whether the intensity of the voice received by the first microphone array is larger, or the intensity of the voice received by the second microphone array is larger; if the intensity of the voice received by the first microphone array is larger, it may be determined that the type of the user is a driver; and if the intensity of the voice received by the second microphone array is larger, it may be determined that the type of the user is a passenger, thereby ensuring that the type of the user is determined accurately.

It should be noted that the embodiment as shown in FIG. 4 is not limited to be applied to the scenario as shown in FIG. 5, and the manner of disposing the microphone arrays in other cases is also applicable.

Figure 6:
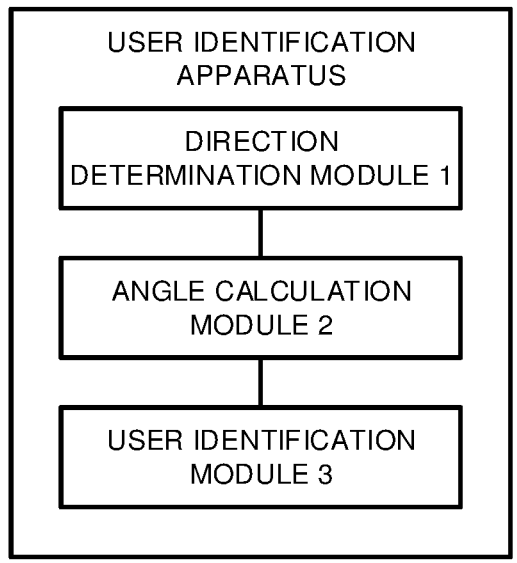
FIG. 6 is a schematic block diagram of a user identification apparatus according to an embodiment of the present disclosure.

FIG. 6 is a schematic block diagram of a user identification apparatus according to an embodiment of the present disclosure. As shown in FIG. 6, the user identification apparatus is applicable to use in a vehicle, wherein the vehicle includes at least two microphone arrays, the respective microphone arrays are disposed at different positions of the vehicle, and the at least two microphone arrays are used for receiving the voice of the user within the vehicle. The vehicle includes:

a direction determining module 1 configured to determine directions from the user to the microphone arrays, respectively, according to the voice;

an angle calculation module 2 configured to calculate an angle between any two of the directions;

a user identification module 3 configured to identify the type of the user based at least on the angle.

Optionally, the at least two microphone arrays include two microphone arrays.

Optionally, a first one of the two microphone arrays is disposed on a side of a driver seat of the vehicle that is away from a copilot seat, and is in line with the driver seat and the copilot seat; and a second one of the two microphone arrays is disposed straight ahead of the copilot seat of the vehicle.

The type includes "driver" and "passenger", wherein the user identification module determines that the type is "driver" if the angle is greater than 90 degrees; and determines that the type is "passenger" if the angle is less than or equal to 90 degrees.

Optionally, a first one of the two microphone arrays is disposed on a side of a driver seat of the vehicle that is away from a copilot seat, and a second one of the two microphone arrays is disposed ahead of the copilot seat of the vehicle.

The type includes "driver" and "passenger", wherein the user identification module determines that the type is "driver" if the angle is greater than a threshold angle; and determines that the type is "passenger" if the angle is less than the threshold angle.

Figure 7:
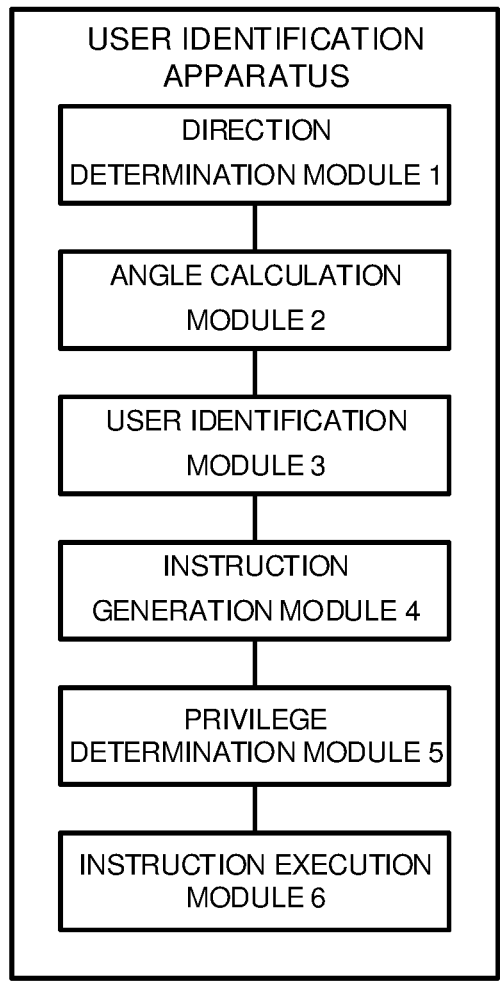
FIG. 7 is a schematic block diagram of another user identification apparatus according to an embodiment of the present disclosure.

FIG. 7 is a schematic block diagram of another user identification apparatus according to an embodiment of the present disclosure. As shown in FIG. 7, on a basis of the embodiment as shown in FIG. 6, the user identification apparatus further includes:

an instruction generation module 4 configured to generate a control instruction according to the voice;

an privilege determination module 5 configured to determine whether the user of the type has a privilege to execute the control instruction according to a correspondence between types and control instructions stored in advance; and an instruction execution module 6 configured to execute the control instruction if the user of the type has the privilege.

Figure 8:
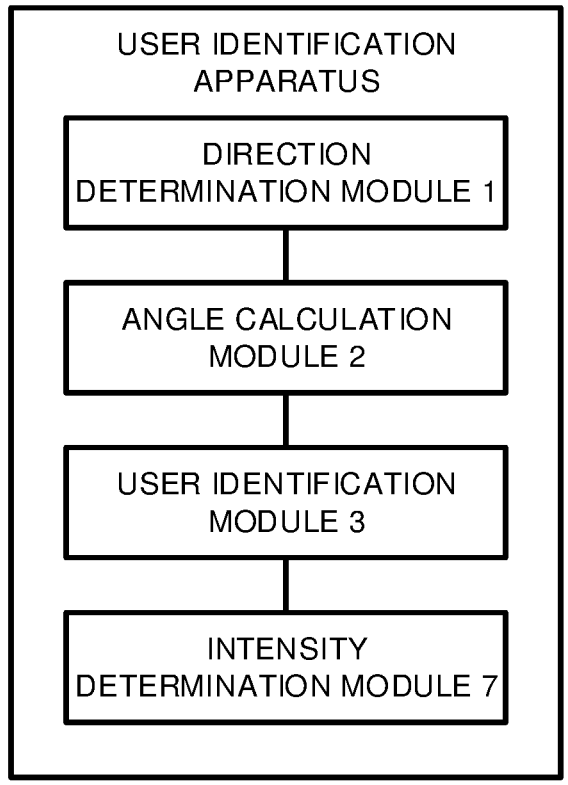
FIG. 8 is a schematic block diagram of another user identification apparatus according to an embodiment of the present disclosure.

FIG. 8 is a schematic block diagram of another user identification apparatus according to an embodiment of the present disclosure. As shown in FIG. 8, on a basis of the embodiment as shown in FIG. 6, the method further includes:

an intensity determination module 7 configured to determine an intensity of the voice;

wherein the user identification module 3 is configured to identify the type of the user according to the angle and the intensity.

An embodiment of the present disclosure further provides an electronic device, the electronic device being disposed on a vehicle, and including:

at least two microphone arrays, wherein the respective microphone arrays are disposed at different positions of the vehicle, respectively; and a processor configured to perform the steps of the user identification method as described in any of the above embodiments.

Figure 9:
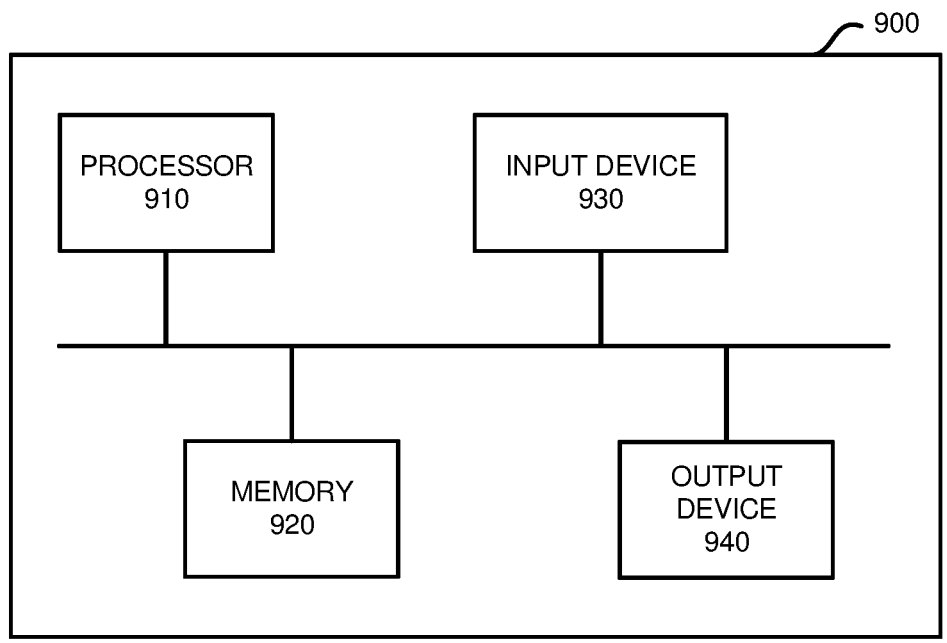
FIG. 9 is an exemplary hardware arrangement diagram of a user identification apparatus according to an embodiment of the present disclosure.

FIG. 9 is an exemplary hardware arrangement diagram of a user identification apparatus according to an embodiment of the present disclosure. As shown in FIG. 9, the electronic device 900 may include a processor 910, a memory 920, an input device 930/output device 930, and the like. It should be noted that the embodiment as shown in FIG. 9 is for illustrative purposes only, and thus does not limit the present disclosure in any way. In fact, the electronic device 900 may include more, fewer, or different modules, and may be separate devices or distributed devices distributed at multiple locations. For example, the electronic device 900 may include, but is not limited to, a satellite controller, an onboard computer, a personal computer (PC), a server, a server cluster, a computing cloud, a workstation, a terminal, a tablet, a laptop, a smart phone, a media player, a wearable device, and/or a home appliance (e.g., a television, a set top box, a DVD player), and the like.

The processor 910 may be a component responsible for the overall operation of the electronic device 900, which may be communicatively connected to other various modules/components to receive data and/or instructions to be processed from other modules/components, and send processed data and/or instructions to other modules/components. The processor 910 may be, for example, a general purpose processor, such as a central processing unit (CPU), a signal processor (DSP), an application processor (AP), and the like. In this case, it may perform one or more of the various steps of the user identification method according to the embodiment of the present disclosure as previously described under the instruction of the instructions/programs/codes stored in the memory 920. Moreover, the processor 910 may also be, for example, a special purpose processor such as an application specific integrated circuit (ASIC), a field programmable gate array (FPGA), or the like. In this case, it may specifically perform one or more of the steps of the user identification method according to the embodiment of the present disclosure as previously described in accordance with its circuit design. Moreover, the processor 910 may also be any combination of hardware, software and/or firmware. Moreover, although only one processor 910 is shown in FIG. 9, the processor 910 may also include one or more processing units distributed at one or more locations in practice.

The memory 920 may be configured to temporarily or persistently store computer executable instructions that, when executed by the processor 910, may cause the processor 910 to perform one or more of the various steps of the various methods described in the present disclosure. In addition, the memory 920 may also be configured to temporarily or persistently store data related to these steps, such as voice data, threshold data, intensity data, and the like. The memory 920 may include a volatile memory and/or a non-volatile memory. The volatile memory may include, for example, but not limited to, dynamic random access memory (DRAM), static RAM (SRAM), synchronous DRAM (SDRAM), cache, and the like. The non-volatile memory may include, for example, but not limited to, one-time programmable read only memory (OTPROM), programmable ROM (PROM), erasable programmable ROM (EPROM), electrically erasable programmable ROM (EEPROM), mask ROM, flash ROM, flash memory (e.g., NAND flash, NOR flash, etc.), hard drive or solid state drive (SSD), high density flash (CF), secure digital (SD), micro SD, mini SD, Extreme Digital (xD), multimedia card (MMC), memory stick, etc. In addition, the memory 920 may also be a remote storage device, such as a networked storage device (NAS) or the like. The memory 920 may also include distributed storage devices distributed at multiple locations, such as cloud storage.

The input device 930/output device 940 may be configured to receive input from outside and/or provide output to the outside. Although the input device 930/output device 940 is shown as devices separate from each other in the embodiment as shown in FIG. 9, it may actually be an input and output device in an integral form. For example, the input device 930/output device 940 may include, but is not limited to, a keyboard, mouse, microphone, camera, display, touch screen display, printer, speaker, earphone, or any other device that may be used for input/output, and the like. In addition, the input device 930/output device 940 may also be an interface, such as a headphone interface, a microphone interface, a keyboard interface, a mouse interface, and the like, configured to be connected to the device as described above. In this case, the electronic device 900 may be connected to an external input/output device through the interface and implement an input/output function. In other words, the electronic device 900 may or may not include one or more of the microphone arrays as mentioned previously.

In addition, the electronic device 900 may also include other modules not shown in FIG. 9, such as a communication module. The communication module may be configured to enable the electronic device 900 to communicate with other electronic devices and exchange various data. The communication module may be, for example, an Ethernet interface card, a USB module, a serial line interface card, a fiber interface card, a telephone line modem, an xDSL modem, a Wi-Fi module, a Bluetooth module, a 2G/3G/4G/5G communication module, and the like. The communication module may also be regarded as a part of the input device 930/output device 940 in the sense of data input/output.

In addition, the electronic device 900 may also include other modules including, for example, but not limited to: a power module, a GPS module, a sensor module (e.g., a proximity sensor, an illuminance sensor, an acceleration sensor, a fingerprint sensor, etc.), and the like.

However, it should be noted that the above-described modules are only examples of a part of modules that may be included in the electronic device 900, and the electronic device according to the embodiments of the present disclosure is not limited thereto. In other words, an electronic device according to other embodiments of the present disclosure may include more modules, fewer modules, or different modules.

In some embodiments, the electronic device 900 as illustrated in FIG. 9 may perform various steps of the various methods as described in connection with FIGS. 1, 3, and/or 4. In some embodiments, the memory 920 stores instructions that, when executed by the processor 910, may cause the processor 910 to perform the various steps of the various methods as described in connection with FIGS. 1, 3, and/or 4.

According to the above embodiments, the angles formed between the directions from the users located at different positions in the vehicle to the two microphone arrays are different, wherein the angle formed between the directions from the user located at the position of the driver to the respective two microphone arrays is significantly distinguished from the angles formed between the directions from the users located at other positions to the two respective microphone arrays. Thus, the type of the user may be determined according to the angle between the directions from the user to the respective two microphone arrays.

By determining the type of the user, it may in turn be determined according to the determined type whether the user who issued the control instruction has a privilege to execute the control instruction, after the voice of the user is received and a control instruction is generated; and the control instruction is executed only when the user has the privilege, so as to ensure security of executing the action.

In the present disclosure, the terms "first" and "second" are used for descriptive purposes only but cannot be construed as indicating or implying relative importance. The term "multiple/plurality" refers to two or more, unless specifically defined otherwise.

Other embodiments of the present disclosure will be readily apparent to the skilled in the art by considering the specification and practicing the present disclosure. The present disclosure is intended to cover any variations, uses, or adaptations of the present disclosure, which are in accordance with the general principles of the present disclosure and include common general knowledge or conventional technical means in the art that are not disclosed in the present disclosure. The specification and embodiments are to be considered as illustrative only, and the real scope and spirit of the present disclosure are defined by the appended claims.

It is to be understood that the present disclosure is not limited to the accurate structures which have been described and shown in the drawings, and may be modified and changed in any way within the scope of the present disclosure. The scope of the present disclosure is limited by the appended claims only.

We claim:

1. A user identification method applicable to a vehicle comprising at least two microphone arrays, the respective microphone arrays being disposed at different positions of the vehicle, respectively, the user identification method comprising:
   receiving a voice of a user within the vehicle through the at least two microphone arrays;
   determining directions from the user to the microphone arrays according to the voice;
   calculating an angle between any two of the directions;
   identifying a type of the user based at least on the angle; and
   determining an intensity of the voice before identifying the type of the user based on at least the angle;
   wherein identifying the type of the user based on at least the angle comprises:
      identifying the type of the user based on the angle and the intensity.

2. The user identification method of claim 1, wherein the at least two microphone arrays consist of two microphone arrays.

3. The user identification method of claim 2, wherein a first microphone array of the two microphone arrays is disposed on a side of a driver seat of the vehicle that is away from a copilot seat, and is in line with the driver seat and the copilot seat; and a second microphone array of the two microphone arrays is disposed straight ahead of the copilot seat of the vehicle.

4. The user identification method of claim 3, wherein the type comprises one of "driver" and "passenger", and wherein identifying the type of the user based at least on the angle comprises:
   determining that the type is "driver" if the angle is greater than 90 degrees; and
   determining that the type is "passenger" if the angle is less than or equal to 90 degrees.

5. The user identification method of claim 2, wherein a first microphone array of the two microphone arrays is disposed on a side of a driver seat of the vehicle that is away from a copilot seat, and a second microphone array of the two microphone arrays is disposed ahead of the copilot seat of the vehicle.

6. The user identification method of claim 5, wherein the type comprises one of "driver" and "passenger", and wherein identifying the type of the user based at least on the angle comprises:
   determining that the type is "driver" if the angle is greater than a threshold angle; and
   determining that the type is "passenger" if the angle is less than the threshold angle.

7. The user identification method of claim 1, further comprising:
   generating a control instruction according to the voice;
   determining whether the user of the type has a privilege to execute the control instruction according to a correspondence between types and control instructions stored in advance; and
   executing the control instruction if the user of the type has the privilege.

8. A user identification apparatus applicable to a vehicle, the user identification apparatus comprising:
   a processor;
   a memory storing instructions that, when executed by the processor, cause the processor to:
      receive, from at least two microphone arrays comprised in the vehicle and disposed at different positions of the vehicle, respectively, a voice of a user within the vehicle detected by the at least two microphone arrays;
      determine directions from the user to the microphone arrays according to the voice;
      calculate an angle between any two of the directions;
      identify a type of the user based at least on the angle; and
      determine an intensity of the voice before identifying the type of the user based on at least the angle;

wherein identifying the type of the user based on at least the angle comprises:
identifying the type of the user based on the angle and the intensity.

9. The user identification apparatus of claim 8, wherein the at least two microphone arrays consist of two microphone arrays.

10. The user identification apparatus of claim 9, wherein a first microphone array of the two microphone arrays is disposed on a side of a driver seat of the vehicle that is away from a copilot seat, and is in line with the driver seat and the copilot seat; and a second microphone array of the two microphone arrays is disposed straight ahead of the copilot seat of the vehicle.

11. The user identification apparatus of claim 10, wherein the type comprises one of "driver" and "passenger", and the instructions, when executed by the processor, further cause the processor to:
determine that the type is "driver" if the angle is greater than 90 degrees; and
determine that the type is "passenger" if the angle is less than or equal to 90 degrees.

12. The user identification apparatus of claim 9, wherein a first microphone array of the two microphone arrays is disposed on a side of a driver seat of the vehicle that is away from a copilot seat, and a second microphone array of the two microphone arrays is disposed ahead of the copilot seat of the vehicle.

13. The user identification apparatus of claim 12, wherein the type comprises one of "driver" and "passenger", and the instructions, when executed by the processor, further cause the processor to:
determine that the type is "driver" if the angle is greater than a threshold angle; and
determine that the type is "passenger" if the angle is less than the threshold angle.

14. The user identification apparatus of claim 8, wherein the instructions, when executed by the processor, further cause the processor to:
generate a control instruction according to the voice;
determine whether the user of the type has a privilege to execute the control instruction according to a correspondence between types and control instructions stored in advance; and
execute the control instruction If the user of the type has the privilege.

15. The user identification apparatus of claim 8, wherein the at least two microphone arrays are a part of the user identification apparatus.

* * * * *